May 29, 1928.
H. N. GUNDELACH
1,671,859
CONNECTING ROD
Filed Dec. 23, 1926
2 Sheets-Sheet 1
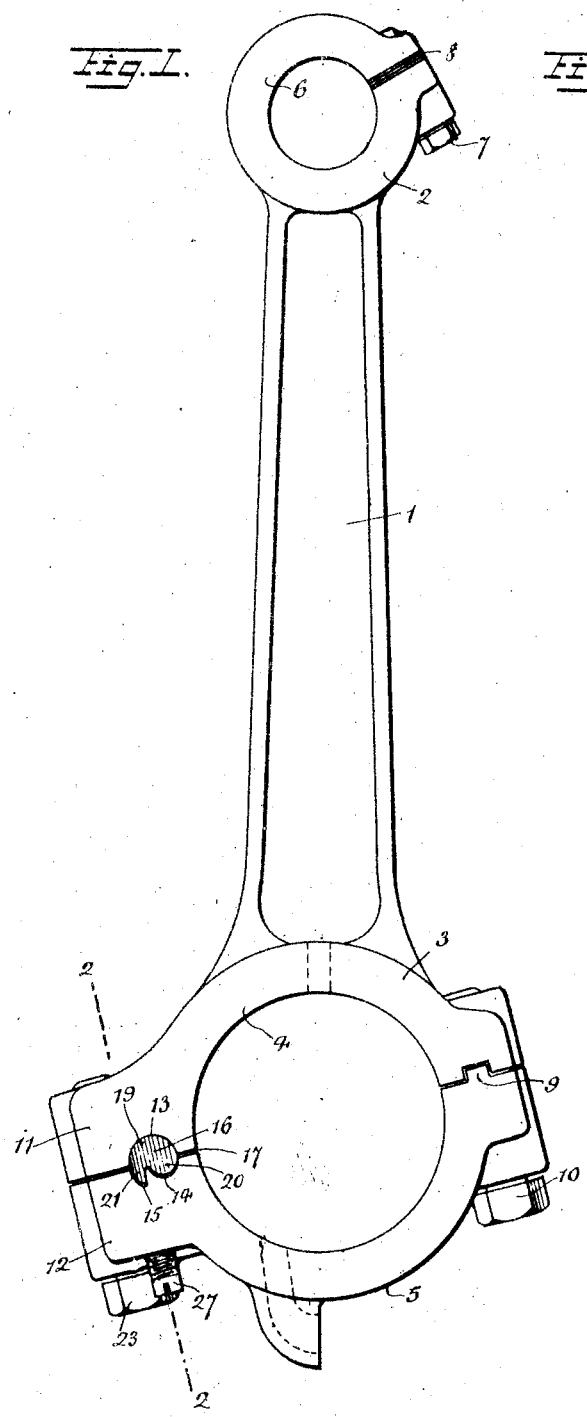
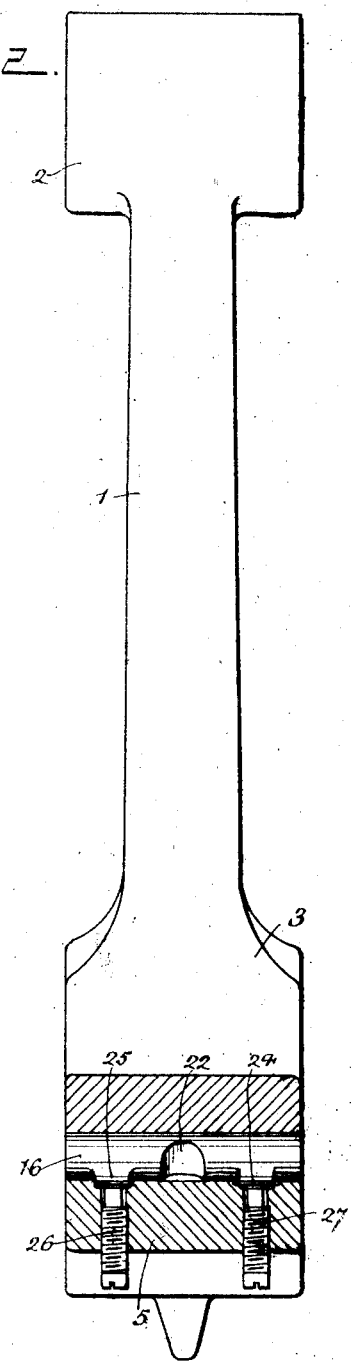
WITNESSES
H. T. Walker
A. L. Kitchin
INVENTOR
H. N. Gundelach
BY
Munn & Co.
ATTORNEY May 29, 1928.
H. N. GUNDELACH
CONNECTING ROD
Filed Dec. 23, 1926
1,671,859
2 Sheets-Sheet 2
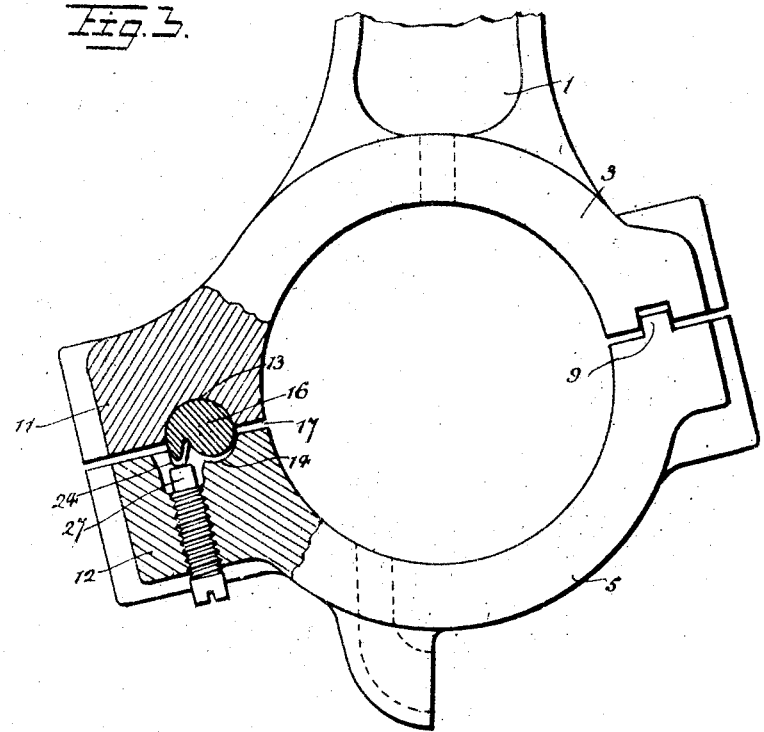
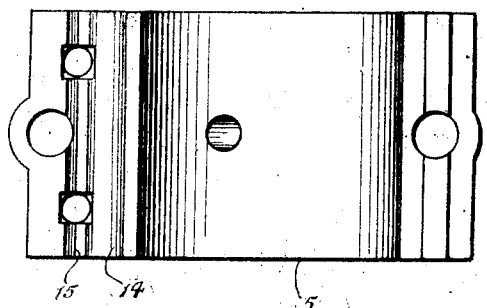
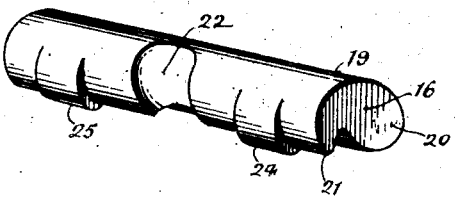
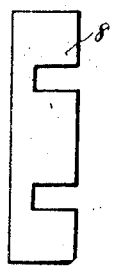
WITNESSES
H. T. Walker
A. L. Kitchin
INVENTOR
H. N. Gundelach
BY
ATTORNEY Patented May 29, 1928.

1,671,859

UNITED STATES PATENT OFFICE.

HENRY N. GUNDELACH, OF NEW YORK, N. Y.

CONNECTING ROD.

Application filed December 23, 1926. Serial No. 156,679.

This invention relates to connecting rods and has for an object to provide an improved construction wherein the usual liner or bushing is eliminated at both ends of the connecting rod.

Another object of the invention is to provide a connecting rod wherein means are provided at the parts surrounding the crank shaft whereby adjustment may be readily had to take care of wear without the use of shims, bushings or other similar articles.

A still further object, more specifically, is to provide in a connecting rod an eccentrically positioned and formed packing member which acts also as a spacer whereby the parts of the bearing structure are apart and yet sealed against the passage of oil.

In the accompanying drawings:—

Figure 1 is a side view of a connecting rod disclosing an embodiment of the invention.

Figure 2 is an edge view of the connecting rod shown in Figure 1 except the lower part which is shown in section taken on the line 2—2 of Figure 1.

Figure 3 is an enlarged side view of the lower part of the connecting rod shown in Figure 1, certain parts being broken away for illustrating certain of the mechanical features.

Figure 4 is an end view of the connecting rod shown in Figure 1 with the adjustable bearing plate removed.

Figure 5 is a perspective view of the spacing and packing member shown in Figure 1.

Figure 6 is an elevation of one of the shims shown at the upper part of Figure 1.

Referring to the accompanying drawings by numerals, 1 indicates a connecting rod as a whole and 2 the top bearing and 3 the bottom bearing. The bottom bearing 3 is provided with an upper section 4 and a lower section 5, said lower section being removable and adjustable in respect to the top section 4. The top bearing 2 is formed from a single loop 6 which is of metal integral with the body of the connecting rod 1. The looped member 6 is divided at one point and is adapted to be held together by any desired number of clamping screws 7. A number of shims 8 are used to hold the divided part of looped portion 6 apart when the screw 7 is tightened. When the connecting rod is new, quite a number of the shims 8 are used and yet the bearing 2 snugly fits around the piston pin. After the device has been in use for some time, the parts may become loose and when this is the case screw 7 is loosened or if there is more than one screw they are all loosened and one of the shims 8 removed. The screw or screws are then tightened and by this method the bore of bearing 3 is reduced and a snug fit is again secured while maintaining substantially continuously a bearing surface on member 2. A shim may be taken out from time to time as the bearing 2 wears until all of the shims have been removed.

At the lower end the bearing 3 co-acts with the crank shaft of the engine and, consequently, the adjustment offered by member 16 and associated parts is larger than that offered at the bearing 2 by the shims 8. In view of this fact and also in view of the strain on these parts, the members are not sprung as is the case with the looped portion 6 but the bearing section 5 is adjusted from time to time to take care of wear of the various parts. The line of division between members 4 and 5 is the point where the least strains take place and on one side a dove-tail or rabbeted structure 9 is provided which permits a limited swinging movement of the member 5 and also provides a substantially oil tight connection when the screws 10 are tightened. On the opposite side the members 4 and 5 are formed with enlargements 11 and 12, enlargement 11 being provided with an arc-shaped groove 13 while enlargement 12 is provided with an arc-shaped groove 14 and a substantially V-shaped groove 15. A spacing and packing member 16 is arranged in these grooves for providing packing to prevent oil from passing through the opening 17 and also provide a member for pressing and steadying the parts. Member 16 is provided with an arc-shaped section 19, a rounded section 20 and a pointed section 21. In addition, the member 16 is formed with a notch 22 for accommodating the large clamping screw 23 which acts to draw the extensions 11 and 12 toward each other. Member 16 is also provided with enlargements or abutments 24 and 25, said abutments being adapted to be engaged by the respective screws 26 and 27.

In operation, when it is desired to adjust member 5 so as to provide a smaller opening for bearing 3 and thereby more snugly fit the crank shaft, screw 10 is loosened slightly and screw 23 is also loosened somewhat. Screws 26 and 27 are then loosened to an appreciable extent after which screws 10 and 23 are tightened until bearing 3 has a good snug fit with its crank shaft. In order to provide a limited looseness to permit easy turning of the parts without wabbling, screws 26 and 27 are then tightened and as these screws are tightened they will press against the section 21 and rotate member 16 in such a direction as to cause members 11 and 12 to spread somewhat. If the screw 23 is too tight to permit any spreading, this screw may be loosened slightly and then screws 26 and 27 operated on. These two screws and screw 23 are adjusted back and forth as the case may be until section 5 is caused to properly fit against the crank shaft and in such a position that any wear will have been taken up. After the adjustment has been provided, the engine or other device to which the connecting rod is connected may be used until an appreciable looseness takes place a second time. A second adjustment may be made and in fact, a large number of adjustments may be made from time to time to take care of the wear of the parts. However, when the adjustment has been made until member 16 is in such a position that the extensions 11 and 12 are brought into contact, any further adjustment is prevented. The use of member 16 in addition to acting as a bracing member and expander acts as a packing for preventing oil from passing out through opening 17.

What I claim is:

1. In a bearing formed in two parts and means presenting an articulated connection for said parts at one point, a screw at a diametrically opposite point connecting said parts together and drawing the parts toward each other, a packing member rotatable in a plane at right angles to the axis of said bearing, said packing member being arranged adjacent said screw, and screw means acting on the packing member for partly rotating the same for spreading said parts as far as said screw will permit.

2. In a bearing structure formed in two parts, means for connecting said structure together and packing means interposed between said parts for holding said parts separated to a greater or less extent, said means including a metallic rotatable member formed on one half as a rounded section and on the other half as an arc-shaped section and a pair of abutments, and set screws acting on the abutments for turning the packing means so as to force said parts away from each other as far as permitted.

3. In a bearing structure formed in two parts, means for connecting said parts together and a combined packing and separating member for separating said parts at one point, said combined packing and separating member comprising a metallic body formed on one half as a semi-cylindrical structure and on the other half as a rounded section, and a substantially V-shaped section in cross section, said V-shaped section having a plurality of abutments adapted to be engaged by clamping screws when the device is in operative position.

HENRY N. GUNDELACH.